US012627845B2

(12) United States Patent
Kipp et al.

(10) Patent No.: US 12,627,845 B2
(45) Date of Patent: *May 12, 2026

(54) METHODS AND SYSTEMS FOR FAULT TOLERANT VIDEO PACKAGING

(71) Applicant: Comcast Cable Communications, LLC, Philadelphia, PA (US)

(72) Inventors: Neill Kipp, Philadelphia, PA (US); Michael Reedell, Philadelphia, PA (US); Blake Orth, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/824,557

(22) Filed: Sep. 4, 2024

(65) Prior Publication Data

US 2025/0056072 A1 Feb. 13, 2025

Related U.S. Application Data

(63) Continuation of application No. 17/890,932, filed on Aug. 18, 2022, now Pat. No. 12,108,095, which is a
(Continued)

(51) Int. Cl.
*H04N 21/2343* (2011.01)
*H04N 21/8547* (2011.01)

(52) U.S. Cl.
CPC ............... *H04N 21/234309* (2013.01); *H04N 21/234336* (2013.01); *H04N 21/8547* (2013.01)

(58) Field of Classification Search
CPC ... H04N 21/234309; H04N 21/234336; H04N 21/8547
See application file for complete search history.

(56) References Cited

U.S. PATENT DOCUMENTS 6,745,364 B2 6/2004 Bhatt et al.
8,751,807 B2 6/2014 Ma et al.
(Continued)

OTHER PUBLICATIONS

U.S. Appl. No. 17/890,932 (2023/0147407), filed Aug. 18, 2022 (May 11, 2023), Neill Kipp (Comcast Cable Communications, LLC).

(Continued)

*Primary Examiner* — Nathan J Flynn
*Assistant Examiner* — Christine A Kurien
(74) *Attorney, Agent, or Firm* — Ballard Spahr LLP

(57) ABSTRACT

Disclosed are various systems and methods for fault tolerant video packaging and transmission. A video packager may receive one or more video content transmissions from a transcoder, and may identify deficient segments, packets, or other portions of the video content transmission. The video packager may also maintain or have access to a default video output that is free of the identified deficiencies. For example, the default video output can include one or more segments of video data comprising a blank or solid color frame, or a still image. The deficient data may be determined based on validation parameters. If the validation parameters are satisfied, the received data is packaged and transmitted. Otherwise, the default video output is packaged to replace deficient portions, and transmitted instead of the received video content.

28 Claims, 5 Drawing Sheets

Related U.S. Application Data continuation of application No. 15/460,860, filed on Mar. 16, 2017, now Pat. No. 11,457,251.

(56)                References Cited

U.S. PATENT DOCUMENTS

| | | | | |
|---|---|---|---|---|
| 8,843,951 | B1 * | 9/2014 | Sherrets | H04N 21/8456 |
| | | | | 725/38 |
| 9,515,904 | B2 | 12/2016 | Besehanic et al. | |
| 9,661,384 | B1 * | 5/2017 | Franzini | G11B 27/36 |
| 10,070,017 | B2 * | 9/2018 | Iwami | H04N 5/067 |
| 10,778,354 | B1 * | 9/2020 | Hegar | H04N 21/23892 |
| 11,252,450 | B2 * | 2/2022 | Smith | H04N 21/8456 |
| 2007/0058730 | A1 * | 3/2007 | Bowra | H04N 19/61 |
| 2010/0077435 | A1 * | 3/2010 | Kandekar | H04N 9/8233 |
| | | | | 725/61 |
| 2011/0080940 | A1 * | 4/2011 | Bocharov | H04N 21/4348 |
| | | | | 375/240.01 |
| 2011/0179455 | A1 * | 7/2011 | Thompson | H04L 47/10 |
| | | | | 725/82 |
| 2012/0030769 | A1 | 2/2012 | De Laet | |
| 2012/0197419 | A1 * | 8/2012 | Dhruv | H04N 21/26258 |
| | | | | 700/94 |
| 2014/0032987 | A1 * | 1/2014 | Nagaraj | H04N 19/00 |
| | | | | 714/E11.131 |
| 2014/0181667 | A1 * | 6/2014 | Chen | H04N 21/84 |
| | | | | 715/716 |
| 2015/0334421 | A1 * | 11/2015 | Deiss | H04N 19/65 |
| | | | | 375/240.27 |
| 2015/0365730 | A1 * | 12/2015 | Mohan | G11B 27/322 |
| | | | | 725/21 |
| 2016/0315990 | A1 | 10/2016 | Naidu | |
| 2017/0070752 | A1 | 3/2017 | Kalevo et al. | |
| 2017/0163700 | A1 * | 6/2017 | Xie | H04L 65/765 |
| 2017/0332120 | A1 * | 11/2017 | Maynard | H04N 21/4882 |
| 2017/0366859 | A1 * | 12/2017 | Chimayan | H04N 21/47217 |
| 2018/0176623 | A1 * | 6/2018 | Nugent | H04L 65/1069 |
| 2018/0191796 | A1 * | 7/2018 | Gandhi | H04L 65/80 |
| 2018/0234116 | A1 * | 8/2018 | Shi | H04N 7/14 |
| 2019/0208282 | A1 * | 7/2019 | Singh | H04N 21/4667 |
| 2019/0259424 | A1 * | 8/2019 | Lintz | H04N 21/4532 |
| 2019/0261056 | A1 * | 8/2019 | Meyer | H04N 21/47202 |
| 2020/0044787 | A1 * | 2/2020 | Wang | H04L 1/0041 |
| 2020/0097731 | A1 * | 3/2020 | Gupta | H04N 21/4667 |
| 2020/0137450 | A1 * | 4/2020 | Mishra | H04N 21/44218 |
| 2020/0275161 | A1 * | 8/2020 | Yan | H04N 21/47217 |
| 2021/0392407 | A1 * | 12/2021 | Aher | H04N 21/4532 |

OTHER PUBLICATIONS

U.S. Appl. No. 15/460,860, (U.S. Pat. No. 11,457,251), filed Mar. 16, 2017 (Sep. 27, 2022), Neill Kipp (Comcast Cable Communications, LLC).

* cited by examiner

Figure 4:
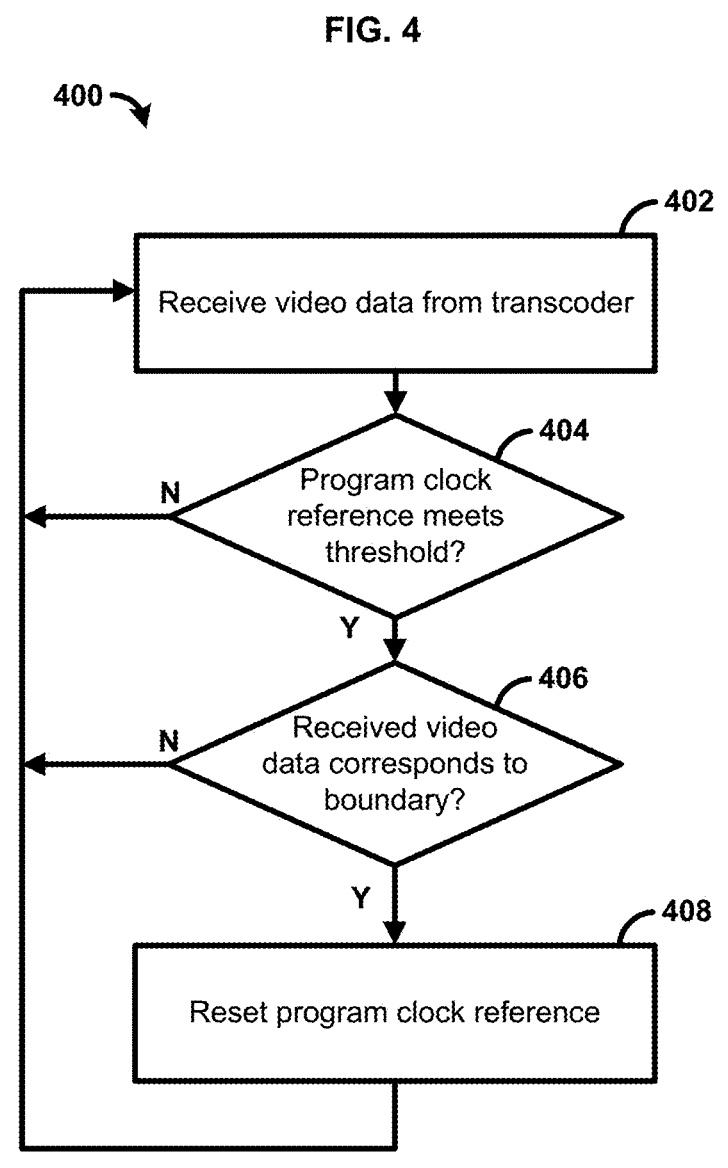

402
Receive video data from transcoder

404
Program clock reference meets threshold?

N

Y

406
Received video data corresponds to boundary?

N

Y

408
Reset program clock reference

METHODS AND SYSTEMS FOR FAULT TOLERANT VIDEO PACKAGING

CROSS REFERENCE TO RELATED PATENT APPLICATIONS

This application claims priority under 35 U.S.C. § 120 to, and is a continuation of, U.S. patent application Ser. No. 17/890,932, filed on Aug. 18, 2022, which claims priority under 35 U.S.C. § 120 to, and is a continuation of, U.S. patent application Ser. No. 15/460,860, filed on Mar. 16, 2017, now U.S. Pat. No. 11,457,251, the entire contents of each of which are hereby incorporated herein by reference in their entirety for all purposes.

BACKGROUND

Content delivery systems utilize video streams to deliver video and/or data from an input source to a content consumer (e.g., a playback device/software). Video stream transmissions are susceptible to various errors during the transport along a transmission path from the input source to the playback device. For example, fragments or packets may be lost during transfer from a content source or transcoder to a video packager. As another example, data may become corrupted prior to receipt by a video packager. The resulting packaged video may cause a variety of problems at the playback device. For a service provider, the missing or corrupted data may cause errors that can necessitate maintenance of network components. These and other shortcomings are addressed by the methods and systems disclosed herein.

SUMMARY

It is to be understood that both the following general description and the following detailed description are exemplary and explanatory only and are not restrictive. Provided are methods and systems for fault tolerant video packaging. In one aspect, a transcoder in a content delivery network can receive one or more streams of video data from one or more input sources. The one or more input sources may correspond to particular channels or content providers of video data. The one or more streams of video data can comprise transmissions having segments or fragments. In an internet protocol network, the segments or fragments can be packaged in one or more packets. The transcoder can encode the one or more streams of video data according to various profiles and transmit the one or more streams of encoded video data to a video packager. Encoding the one or more streams of video data can also include segmenting the one or more streams of video data such that the one or more streams of encoded video data is divided into segments, e.g. two second segments, or segments of another predefined time duration.

The video packager can perform one or more validation checks on the one or more streams of encoded video data received from the transcoder. In an aspect, the video packager may determine whether portions of the received encoded video data satisfy one or more validation parameters. For example, the video packager may confirm that a portion of received encoded video data conforms to a particular profile used by the transcoder to encode the encoded video data. The video packager may also confirm that no portions or packets of the stream of encoded video data have been corrupted, dropped, lost, or are otherwise not usable.

In another aspect, the video packager can also be configured to maintain a default video output for each of the one or more streams of encoded video data received from the transcoder. The default video output can include default video data. The default video output can comprise one or more segments of video data generated by the video packager. In an aspect, default video data can comprise one or more still image frames, one or more single color frames, or other video data generated by the video packager. The default video may be encoded according to a respective profile used by the transcoder. For example, if the transcoder encodes video data according to a plurality of profiles, the video packager can generate default video output encoded according to each one of the plurality of profiles.

In use, if a portion of a stream of received encoded video data satisfies one or more validation parameters, the video packager can package the received encoded video data by applying timing data or signaling data, and then output the packaged encoded video data to an origin, or source, that will serve the stream of packaged encoded video data to playback devices. If one or more validation parameters for a portion of encoded video data is unsatisfied, the video packager instead packages a portion of the default video output encoded according to the profile of the encoded video data. The packaged default video output portion is transmitted to the origin or source. As the default video output is generated and maintained by the video packager, it is not susceptible to errors introduced during transport between the one or more input sources and the transcoder, or between the transcoder and the video packager. Thus, the playback devices always receive playable video data, either packaged encoded video data originating from the input source or packaged default video output generated by the video packager. This eliminates software or device crashes that may result from a playback device attempting to render unplayable video.

The video packager maintains a program clock reference (PCR) that is incremented as encoded video data is received from the transcoder. When streams of video data are divided into segments by the transcoder during encoding, packaging or playback errors can occur. In an aspect of the disclosure, the video packager can be configured to implement a rollover of the PCR on a segment boundary, thereby avoiding errors that could occur as a result of the PCR rollover occurring within a segment.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 is a flowchart illustrating an example method; and

DETAILED DESCRIPTION

Figure 1:
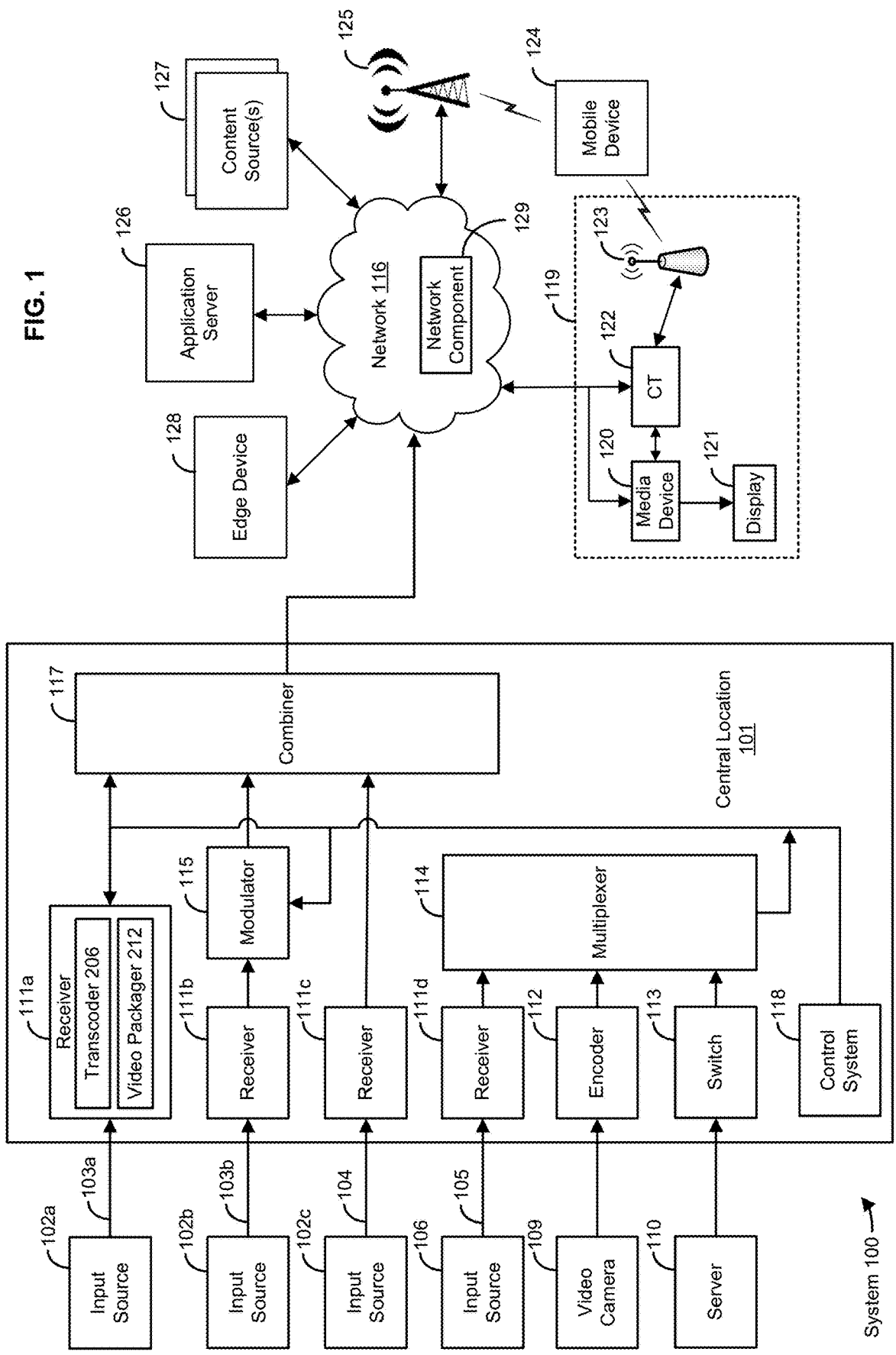
FIG. 1 is a block diagram illustrating various aspects of an exemplary content delivery network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4 k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to methods and systems for fault tolerant video packaging. A video packager can to package video data for transmission to a content origin, such as a streaming video server, linear television content origin, or another origin of content facilitating transport of the data to playback devices, which will then transmit the packaged video data to playback devices. For example, in aspects in which video data provided to the video packager by a transcoder has not been segmented, the video packager may segment the received encoded video data into Dynamic Adaptive Streaming over HTTP (DASH) segments, or otherwise divide the received encoded video data into segments. The video packager may also generate corresponding manifests describing segments, bitrates, available audio tracks, and other features of a stream of video data.

The video data from the transcoder is susceptible to various errors before being received by the video packager. For example, packets may be corrupted during transport to the video packager. As the packets may be delivered using a Universal Datagram Protocol, there is no guarantee of packet delivery and packets may be lost. A segment of video data having missing or corrupted packets may not be properly packaged by the video packager. The resulting packaged video data can result in a detrimental experience by a playback device attempting to render the video, including error notifications, hardware or software crashes, or other errors.

To address the possibility of faulty video being received from a transcoder, a video packager can be configured to maintain a default video output. The default video output can comprise video data generated by the video packager. In an aspect, the default video output can comprise one or more segments of video data generated by the video packager. As the transcoder may encode a given portion of video data according to each of multiple profiles, the default video output can be encoded according to each of the respective profiles. In an aspect, the default video output may include a static frame of a single color, such as a black screen. In another aspect, the default video output may include one of many static images, or "slates." These slates may include branding for a respective channel or program, advertisements, informational notices, or other information.

In an aspect, the video packager can be configured to determine if the video data received from the transcoder satisfies one or more validation parameters. Determining if the video data satisfies one or more validation parameters may be performed on a per-packet basis. For video data grouped into segments, these checks may also be performed on a per-segment basis, or for another portion of video. For example, in an aspect, the video packager may determine if the video data satisfies one or more validation parameters by comparing the received video data to the profile used by the transcoder to encode the video data. In an aspect, the video packager may determine which profile to use for comparison according to a header or identifier included in a video data packet. In another aspect, the video packager may determine which profile to use for comparison based on a network port to which the video data was transmitted by the transcoder. The profile may include attributes such as bit rates, resolutions, formatting, audio or subtitle tracks, or other attributes. In an aspect, the video packager may verify the portion of video data to ensure that the attributes of the received video data matches the profile. In another aspect, the video packager may verify that an attribute of the portion of video data is within a fault tolerance threshold relative to the profile. In a further aspect, the video packager may determine if one or more packets are missing, or do not contain all data. This can include determining if a number of missing packets meets or exceeds a threshold.

If the portion of received video data satisfies the validation parameters, the video packager can be configured to package the received video data into a format configured for transmission by a content origin to a playback device. This can include applying headers or other metadata to facilitate streaming or transmission to a playback device. As another example, in aspects where segmenting is not performed by the transcoder, this can include generating segments of video data, including DASH segments. The video packager can also applying additional signaling data, such as SCTE-35, or timing data into the video data. The packaged video data can then be sent to a content origin, such as a streaming video server, linear television content origin, or another origin of content facilitating transport of the data to playback devices.

If the portion of the received video data fail to satisfy the validation parameters, the video packager instead packages a portion of the default video output for transmission to the content origin. This can include applying the timing data, signaling data, and additional metadata to the default video output as a DASH segment or another formatted segment. The packaged default media output may correspond to a different playback length than the portion of received video data that failed to satisfy the validation parameters. For example, the received video data may be encoded as a two-second segment. The video packager may generate a two-second segment of default video output, or may generate multiple two-second segments of the default video output.

In further aspects, the video packager may maintain a program clock reference (PCR). The PCR may include, for example, a 33-bit counter incrementing at a 90 KHz frequency. When the PCR reaches its maximum value, it resets to begin incrementing again. As received video data may be grouped into segments corresponding to periods or time, such as a two-second segment, the PCR may roll over during the receipt of packets for a given segment. As the presentation time stamp (PTS) of a packet may be relative to the PCR, the timing information of a video segment may be incongruous when the PCR resets during a segment. This may result in playback errors by a playback device attempting to render segments with incongruous timing information. In an aspect, to prevent this error, the video packager may force a reset or rollover of the PCR on a segment boundary. The video packager may identify a segment boundary due to segment boundary information included in the video data received from the transcoder. The video packager may also determine a segment boundary based on a preferred or predefined segment length when the video data received from the transcoder does not include segmenting information.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. In an aspect, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an aspect, a multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

In an aspect, the communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

In an aspect, the user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

In an aspect, the user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

In an aspect, the system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

In an aspect, the system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. In an aspect, the content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

In an aspect, the system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

In an aspect, the network 116 can comprise a network component 129. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like.

In an exemplary embodiment, at least a portion of the methods and systems disclosed can be located within the receivers 111*a-c*. The receivers 111*a-c* may include, for example, a transcoder 206 configured to receive video data from respective input sources 102*a-c*. The video data may be encoded as MPEG data transmitted through a Universal Datagram Protocol (UDP) for receipt by the transcoder 206 of the respective receiver 111*a-c*. The transcoder 206 may then compress or otherwise transform the video data. For example, the transcoder 206 may apply H.264 or other compression. The transcoder 206 may also add segmenting data defining segment boundaries in the received video data. The segment boundaries may be encoded at a predefined time interval of the video data, such as every two seconds. The transcoder 206 may also add signaling data such as SCTE-35 or other signaling data to the received video data. In an aspect, for a given portion of received video data, the transcoder 206 may encode the portion of received video data into multiple portions of received video data according to each of multiple profiles. The profiles may define one or more attributes of the video data, for example, bit rates, resolutions, screen formats, audio tracks, or other attributes. The transcoded video can then be output to a video packager 212 in the respective receiver 111*a-c*.

The video packager 212 can be configured to determine if the portions of received video data from the transcoder satisfy one or more validation parameters. If the one or more validation parameters are satisfied, the video packager 212 outputs the portion of video data and corresponding manifests to the shown combiner 117, or to a linear origin such as a CT 122, application server 126, content source 127 or edge device 128. If one or more validation parameters are unsatisfied, the video packager 212 can instead output a default video output corresponding to the profile of the received portion of video data.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. In an exemplary embodiment, the present methods and systems can employ transmission of MPEG packets. However, the present methods and systems are not so limited, and can be implemented using other types of transmission and data.

The output of a single MPEG audio and/or video coder is called a transport stream comprised of one or more elementary streams. An elementary stream is an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs and their associated PESs can be multiplexed into a multi program transport stream. A multi program transport stream has a program clock reference (PCR) mechanism that allows transmission of multiple clocks, one of which is selected and regenerated at the decoder.

A multi program transport stream is more than just a multiplex of audio and video PESs. In addition to the compressed audio, video and data, a transport stream includes metadata describing the bit stream. This includes the program association table (PAT) that lists every program in the multi program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can all have the same PID, so that the decoder (or a demultiplexer) can select the elementary stream(s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more PIDs that are related to each other. For instance, a multi program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program. It can discard the contents of all other PIDs.

The multi program transport stream carries many different programs and each may use a different compression factor and a bit rate that can change dynamically even though the overall bit rate stays constant. This behavior is called statistical multiplexing and it allows a program that is handling difficult material to borrow bandwidth from a program handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream can comprise Conditional Access (CA) information to administer this protection. The transport stream can comprise Program Specific Information (PSI) to handle these tasks.

Figure 2:
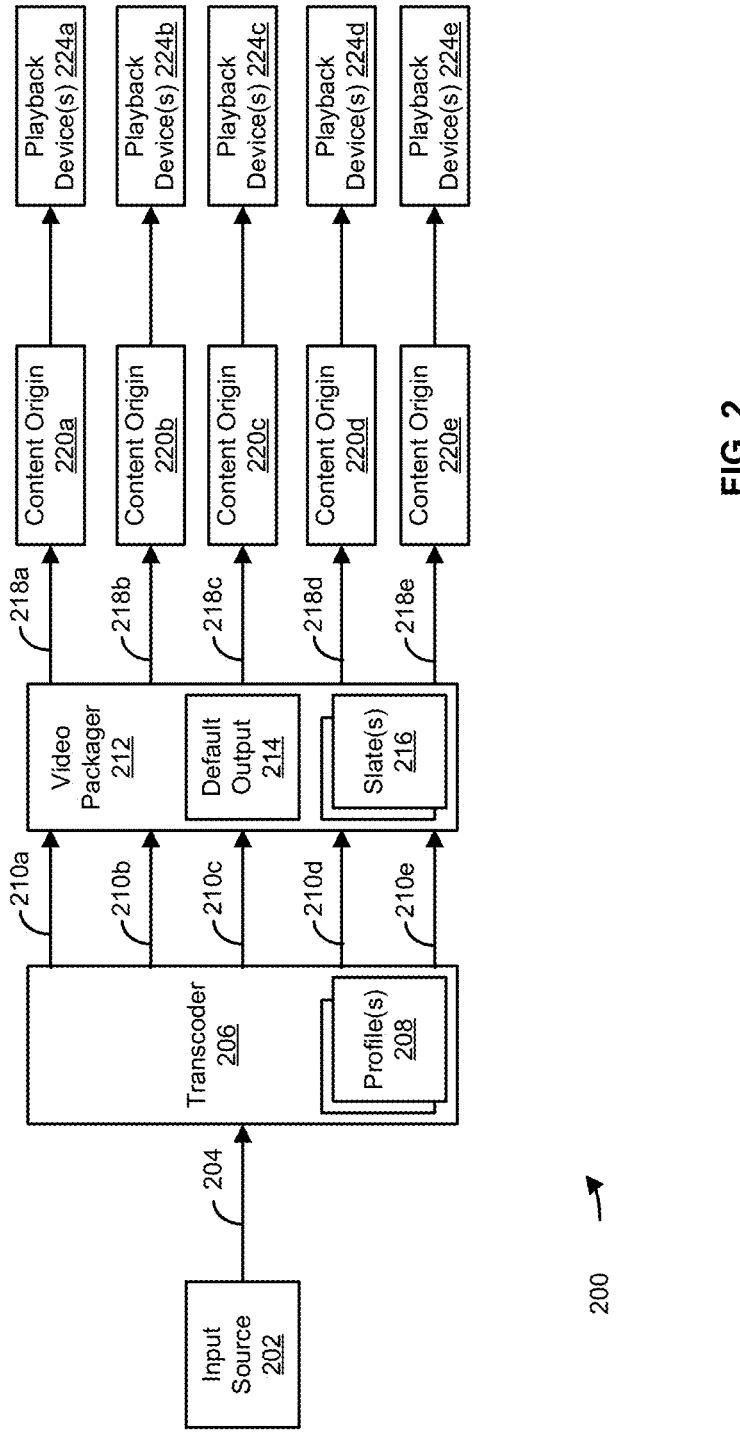
FIG. 2 is a block diagram illustrating various aspects of a video packaging system.

FIG. 2 depicts an example video packaging system. In this example, the input source 202 may correspond to the input source 102a-c of FIG. 1. The input source 202 is representative of a channel, r content provider or another source that is transmitting content, or making content available, to a content distribution system. In this example, the input source 202 transmits video data 204 to a transcoder 206. The transcoder 206 and video packager 212 may correspond to components of a receiver 111a-c of FIG. 1. In an aspect, the video data 204 transmitted to the transcoder may be encoded in MPEG format and transmitted using a Universal Datagram Protocol (UDP). In an aspect, the video data 204 may be representative of a portion of a multicast transmission from the input source 202.

In an aspect, the transcoder 206 encodes or otherwise transforms the received video data 204. This can include applying segmenting data defining segment boundaries in a video stream. This can also include applying a compression algorithm to the received video data 204. This can also include adding signaling data, such as SCTE-35 data, to the received video data 204. In an aspect, the transcoder 206 may access multiple profiles 208 defining attributes for encoding the received video data 204. The profiles may define attributes of the video data, for example, bit rates, video resolutions, audio tracks, formatting, aspect ratios, or other attributes. Thus, for a given portion of the received video data, the transcoder 206 may produce multiple outputs of encoded video data 210a-e, each corresponding to a respective profile 208. The encoded video data 210a-e may be transmitted to the video packager 212 using UDP or another transport protocol. Additionally, the encoded video data 210a-e may be transmitted to the video packager 212 as unicast messages or as portions of a multicast message to multiple video packagers 212.

In an aspect, the encoded video data 210a-e output by the transcoder 206 is then received by the video packager 212. The video packager 212 maintains a default video output 214 of video data. Maintaining default video output 214 can comprise generating and/or storing one or more segments or portions of video data by the video packager 212. The segments of default video output 214 can be packaged and/or transmitted in lieu of packaged versions of the encoded video data 210a-e as will be described in greater detail below. In an aspect, the video packager 212 may maintain multiple default video outputs 214 encoded according each of the profiles 208. In other words, the video packager 212 maintains a default video output 214 corresponding to each of the encoded video data 210a-e outputs from the transcoder 206.

In an aspect, the default video output 214 can include a still frame of a single color, such as a black screen. In another aspect, the default video output 214 may include a still frame selected from a library of still images, or "slates" 216. In such an aspect, the video packager 212 may select a slate 216 from multiple slates 216 according to a program or channel corresponding to the input source 202, according to an advertising or sponsorship agreement, or according to other criteria. Accordingly, the slates 216 may include program or channel identifying information, status updates, advertisements, or other information. For example, the video packager 212 can store slates 216 corresponding to one or more broadcast programs, with the slates 216 identifying or advertising their broadcast programs. As another example, the video packager 212 can store slates 216 corresponding to one or more advertisers or advertised products, with the slates 216 comprising still image advertisements. The video packager 212 can select a slate 216 for inclusion in the default video output 214 based on what content the default video output 214 is replacing, e.g. presenting a still image advertisement slate 216 when encoded video data 210a-e for an advertisement fails validation.

In an aspect, the video packager 212 can determine if the received encoded video data 210a-e satisfies one or more validation parameters. In an aspect, this can include determining if the received encoded video data 210*a-e* conforms to a corresponding profile 208. In a further aspect, this can include determining if a portion of audio or video data has been corrupted. For example, if the received encoded video data 210*a-e* includes a hash value, cyclical redundancy check value, or other validation value, the video packager 212 may calculate the validation value and compare it to the value included in the received encoded video data 210*a-e*. In an aspect, determining if the received encoded video data 210*a-e* satisfies one or more validation parameters can include determining if a stream index of the received encoded video data 210*a-e* matches an expected or ideal index value. The stream index may include, for example, a program map table (PMT) value or another value.

In an aspect, if the video packager 212 receives encoded video data 210*a-e* through UDP, there is no guarantee of packet delivery. Accordingly, the encoded video data 210*a-e* is susceptible to packet loss. Accordingly, in an aspect, satisfying the one or more validation parameters can include determining if a number of missing packets for the encoded video data 210*a-e* meets or exceeds a threshold. This can include determining if a continuity counter of a received packet deviates from an expected continuity counter. The continuity counter may include an incremental counter, a presentation time stamp (PTS) value, or another method of depicting a contiguous set of packets.

If a respective one of the portions of encoded video data 210*a-e* satisfies the validation parameters, it can be packaged and output as a respective packaged video data 218*a-e*. Packaging the video data 210*a-e* can include segmenting the encoded video data 210*a-e* as a DASH segment or other streaming video segment if such an operation was not performed by the transcoder 206. Packaging the encoded video data 210*a-e* can also include generating a manifest for the corresponding packaged video data 218*a-e*. If a respective one of the portions of encoded video data 210*a-e* fails a validation parameter, the video packager 212 instead packages a segment of the default video output 214 as the corresponding output 218*a-e*. In an aspect, packaging the default video output 214 can include selecting default video output 214 for packaging from a plurality of default video outputs 214. For example, the video packager 212 can determine a profile 208 for the encoded video data 210*a-e* that failed the validation parameter. The default video output 214 can then be selected as the default video output 214 encoded according to the determined profile 208. As another example, The video packager 212 can select the default video output 214 based on a channel or content corresponding to the encoded video data 210*a-e* failing the validation check. For example, the video packager 212 can select default video output comprising a slate 216 corresponding to the channel or content.

In an aspect, packaging the default video output 214 can include selecting a segment of default video output 214 data for packaging. In another aspect, packaging the default video output 214 can include generating one or more segments of default video output 214 be encoding one or more video frames into a segment of video data. The video frames can comprise a slate 216, another image, or content as can be appreciated.

In an aspect, packaging the default video output 214 can include applying segment boundaries, continuity data, signaling data, and other data corresponding to the respective one of the encoded video data 210*a-e* that failed to satisfy the validation parameters. As an example, for a given segment of encoded video data 210*a-e*, assume video data 210*a-d* satisfies the validation parameters, and encoded video data 210*e* fails one or more validation parameters. In this example, the video packager 212 would package the encoded video data 210*a-d* as packaged video data 218*a-d*, and package the default video output 214 as packaged video data 218*e* for the given segment.

In an aspect, packaging the encoded video data 210*a-e* or default video output 214 may include applying timing information to the packaged video data 218*a-e*. In an aspect, the video packager 212 may maintain a timing reference. The timing reference may include, for example, a program clock reference (PCR), presentation time stamp (PTS), or other timing value. In an aspect, the packaged video data 218*a-e* may be generated to include the timing reference maintained by the video packager 212. In an aspect, the video packager 212 can correct continuity errors or maintain continuity for timing references included in the received video data 210*a-e*. For example, the received encoded video data 210*a-e* may include timing references that deviate from an expected timing reference. This may be due to a corruption in the timing reference applied by the transcoder 206. This may also be due to the video packager 212 switching from one transcoder 206 to another transcoder 206 (not shown) for given video data 204 from an input source 202. The different transcoders 206 may maintain different timing references, and therefore output encoded video data 210*a-e* with different timing references. The video packager 212 can correct this discrepancy by overwriting the timing reference in received encoded video data 210*a-e* with the timing reference maintained by the video packager 212. Thus, recipients of the packaged video data 218*a-e* are not exposed to continuity errors.

In a further aspect, the video packager 212 may maintain a program clock reference (PCR). The PCR may include, for example, an incremental counter. In an aspect, the PCR includes a 33-bit counter incrementing at 90 KHz. On reaching a maximum value, the PCR rolls over and resets. To prevent rendering or packaging errors caused by the PCR resetting outside of a segment boundary for the encoded video data 210*a-e*, the video packager 212 can force a reset of the PCR on a segment boundary. For example, the video packager 212 can reset the PCR after receiving a packet of encoded video data 210*a-e* indicating the end of a segment. The next received packet of encoded video data 210*a-e* for the beginning of a segment would then be received on or after the PCR reset.

In an aspect, the packaged video data 218*a-e* can be transmitted to respective linear origins 220*a-e*. The content origins 220*a-e* can facilitate the distribution of content to playback devices 224*a-e*. In this example, the content origins 220*a-c* may correspond to the CT 122, application server 126, content source 127, or edge device 128 of FIG. 1. The playback devices 224*a-e* may correspond to media devices 120, displays 121, mobile devices 124 of FIG. 1, or other user devices as can be appreciated.

Figure 3:
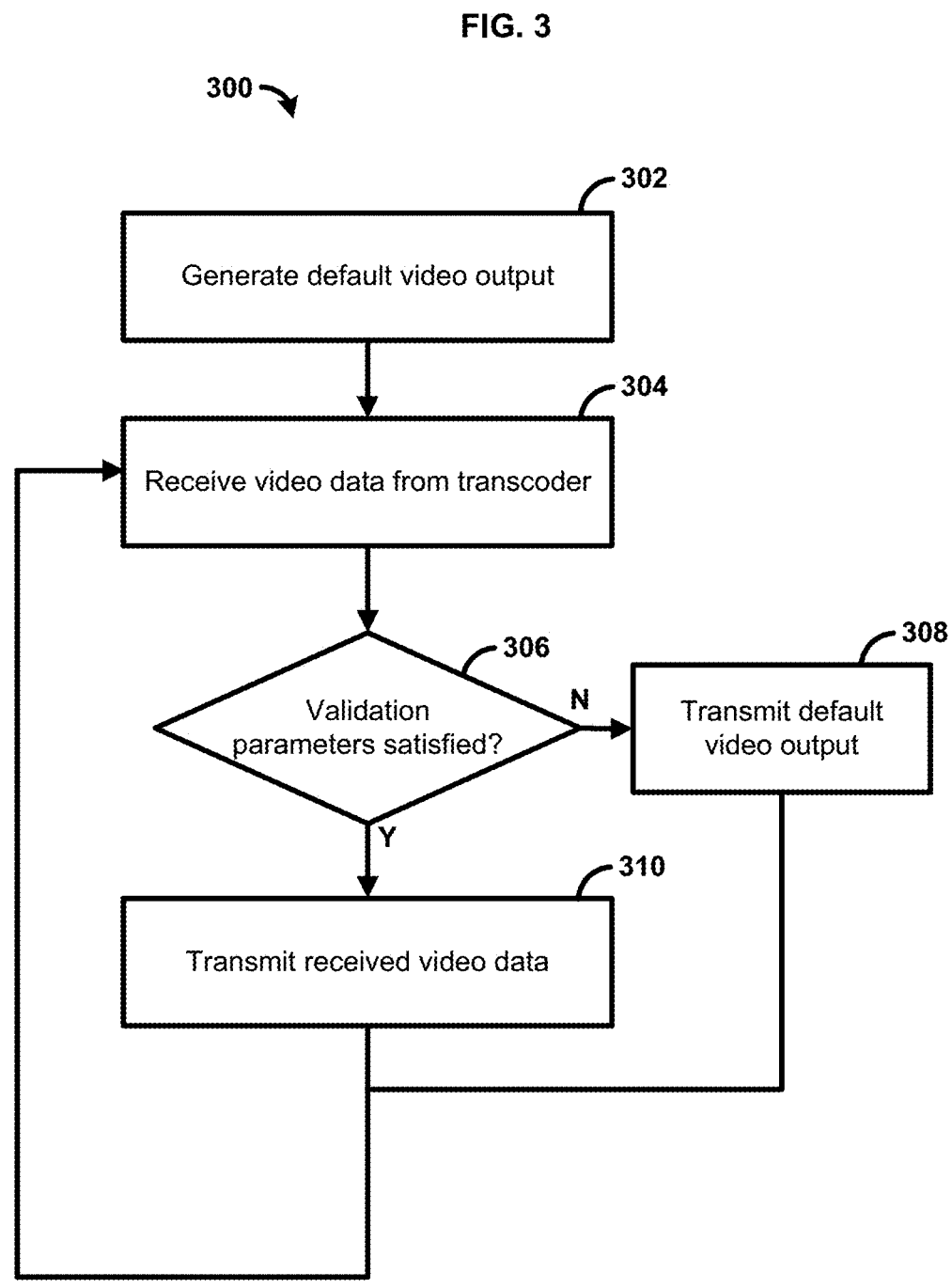
FIG. 3 is a flowchart illustrating an example method.

FIG. 3 discloses an example method 300. Beginning with step 302, a video packager 212 can generate a default video output 214. Default video output 214 can comprise one or more segments of video data generated by the video packager 212. In an aspect, generating default video output 214 can include generating multiple default video outputs 214 each corresponding to a respective profile 208 or input stream of encoded video data 210*a-e*. In an aspect, the default video output 214 can include a still frame of a single color, such as a black screen. In another aspect, the default video output 214 may include a still frame selected from a library of still images, or "slates" 216. Thus, generating default video output 214 can include generating one or more segments of video data comprising one or more frames each comprising the still frame or slates 216. In an aspect, the slates 216 can be coded with a content code or other identifier for use in selection of a slate 216 for inclusion in default video output 214.

In step 304, the video packager 212 can receive encoded video data 210*a-e* from the transcoder 206. The encoded video data 210*a-e* can be received as MPEG video or another format. The encoded video data 210*a-e* can be received using UDP or another protocol. In addition to encoded video data 210*a-e*, the video packager 212 can receive signaling data, segment boundary data, or additional metadata from the transcoder 206. After receiving the encoded video data 210*a-e*, in step 306, the video packager 212 can determine if the received encoded video data 210*a-e* satisfies one or more validation parameters. In an aspect, this can include determining if one or more attributes of the received encoded video data 210*a-e* matches an expected attribute value or falls range of attribute values indicated in the profile 208. In a further aspect, this can include determining if a portion of audio or video data has been corrupted. For example, if the received encoded video data 210 includes a validation value, such as a hash value, a cyclical redundancy check value, or other validation value, the video packager 212 may calculate the validation value and compare it to the validation value included in the received encoded video data 210*a-e*. In an aspect, determining if the encoded received video data 210*a-e* satisfies one or more validation parameters can include determining if a program map table (PMT) value of the received encoded video data 210*a-e* matches an expected PMT value according to the MPEG-2 standard. For example, for encoded received video data 210*a-e* for a given program, the video packager 212 can determine if the received PMT value matches a previously received or known PMT value for that program. In a further aspect, determining if the encoded received video data 210*a-e* satisfies one or more validation parameters can include determining if a number of missing or dropped packets falls meets or exceeds a threshold.

In an aspect, the determination of step 306 may be performed on a per-segment basis. For example, if a packet, frame, or other portion of one encoded video data 210*a-e* fails a validation parameter, then the video packager 212 may treat the entire segment of the respective video data 210*a-e* as having failed the validation parameter. In an aspect, the video packager 212 may perform one or more remedial actions on portions of encoded video data 210*a-e* failing a validation parameter in order to allow the segment overall to be treated as passing the validation parameter. For example, if one or more frames of a packet fail a validation parameter, the video packager may replace the failing frames in the segment with one or more duplicates of sequentially adjacent or sequentially nearest frames passing the validation parameter. In an aspect, the video packager 212 may apply a remedial action to failing frames in response to a number of passing frames in the segment meeting or exceeding a threshold. For example, the video packager 212 can apply a remedial action to failing frames if a given segment or packet has eighty percent or more passing frames. Thus, if a significant portion of a segment is otherwise valid, the video packager 212 performs the remedial action in order to allow the valid frames to be transmitted instead of an entire segment of default video output 214. In an aspect, the video packager 212 may add audio data to the duplicated sequentially adjacent or sequentially nearest frames. In an aspect, the audio data may include attenuated volume corresponding to adjacent valid original frames prior to or subsequent to the duplicated frames. In an aspect, the duplicated sequentially adjacent or sequentially nearest frames may include silent audio data.

If the encoded video data 210*a-e* satisfies the validation parameters or is otherwise remediated to pass the validation parameters, the method 300 can advance to step 310 where the encoded video data 210*a-e* is packaged and transmitted as respective packaged video data 218*a-e*. Packaging the encoded video data 210*a-e* can include encoding a segment of the video data 210*a-e* as a DASH segment or other streaming video segment. Packaging the encoded video data 210*a-e* can also include generating a manifest for the corresponding packaged video data 218*a-e*. After transmitting the packaged video data 218*a-e*, the method 300 can return to step 304 where the video packager 212 continues to receive encoded video data 210*a-e* from the transcoder 206.

If a respective one of the portions of encoded video data 210*a-e* fails a validation parameter, the method 300 can advance to step 308 where the video packager 212 instead packages a segment of the default video output 214 as the corresponding packaged video data 218*a-e*. As the default video output 214 is generated by the video packager 212, it is not susceptible to data errors introduced during transport between a content source and the transcoder, or between the transcoder 206 and video packager 212. Moreover, the default video output 214 is generated and/or stored such that the default video output 214 satisfies the applied validation parameters, thereby reducing the likelihood of errors experienced by user devices on rendering.

In an aspect, packaging the default video output 214 can include applying segment boundaries, timing data, continuity data, signaling data, or other data corresponding to the respective one of the encoded video data 210*a-e* that failed to satisfy the validation parameters. Thus, the video packager 212 applies segment boundaries, timing data, continuity data, signaling data, or other data to the packaged default video output 214 that would have otherwise been applied to the encoded video data 210*a-e* had it satisfied the validation parameters. Additionally, the default video output 214 to be packaged may be of a duration different from the encoded video data 210*a-e* that failed the validation parameters. For example, if a two second segment of encoded video data 210*a-e* failed the validation parameters, the video packager 212 may package and output a segment of default video output 214 greater than two seconds, or output multiple two second segments of default video output 214. After transmitting the default video output 214 as packaged video data 218*a-e*, the method 300 can return to step 304 where the video packager 212 continues to receive encoded video data 210*a-e* from the transcoder 206.

FIG. 4 depicts an example method 400. Beginning with step 402, the video packager 212 can receive encoded video data 210*a-e* from the transcoder 206. The encoded video data 210*a-e* can be received as MPEG video or another format. The encoded video data 210*a-e* can be received using UDP or another protocol. In addition to encoded video data 210*a-e*, the video packager 212 can receive signaling data, segment boundary data, or additional metadata. After receiving the encoded video data 210*a-e*, in step 404, the video packager 212 can determine if a program clock reference (PCR) meets a threshold. The threshold may correspond to a value indicating an imminent rollover of the PCR during receipt of a current or a subsequent video segment. In an aspect, the threshold can be calculated as PCR_Max−Freq*Segment_lenth, where PCR_Max is a maximum value of the PCR before rollover, Freq is the frequency of a clock speed, and Segment_length is a time duration for a segment. For example, assume a PCR with a 33-bit base value and a 9-bit extension that increments according to a 90,000 Hz clock. The resulting maximum PCR value is 2,576,980,377,599. For a two-second segment length, the threshold can be defined as 2,576,980,377,599–(90000*2)=2,576,980,197599. If the PCR falls below the threshold, the method 400 can return to step 402 where the video packager continues to receive encoded video data 210a-e from the transcoder 206.

If the PCR is above the threshold, the method 400 can advance to step 406, where video packager 212 can determine if the received encoded video data 210a-e corresponds to a segment boundary. Determining if the received encoded video data 210a-e corresponds to a segment boundary can include determining if a segment marker or other boundary identifier is included in the received encoded video data 210. In an aspect where the transcoder 206 does not apply segment boundary information, the video packager 212 can determine if the received encoded video data 210 corresponds to an end of a time duration of video since a last segment boundary created by the video packager 212. In such an aspect, the video packager 212 can also mark the segment boundary in the encoded video data 210a-e.

If the received encoded video data 210a-e corresponds to a segment boundary, the video packager 212 can reset the PCR and can return to step 402, where the video packager 212 can continue to receive encoded video data 210a-e from the transcoder 206. Otherwise, the method 400 can return to step 402 without resetting the PCR.

Figure 5:
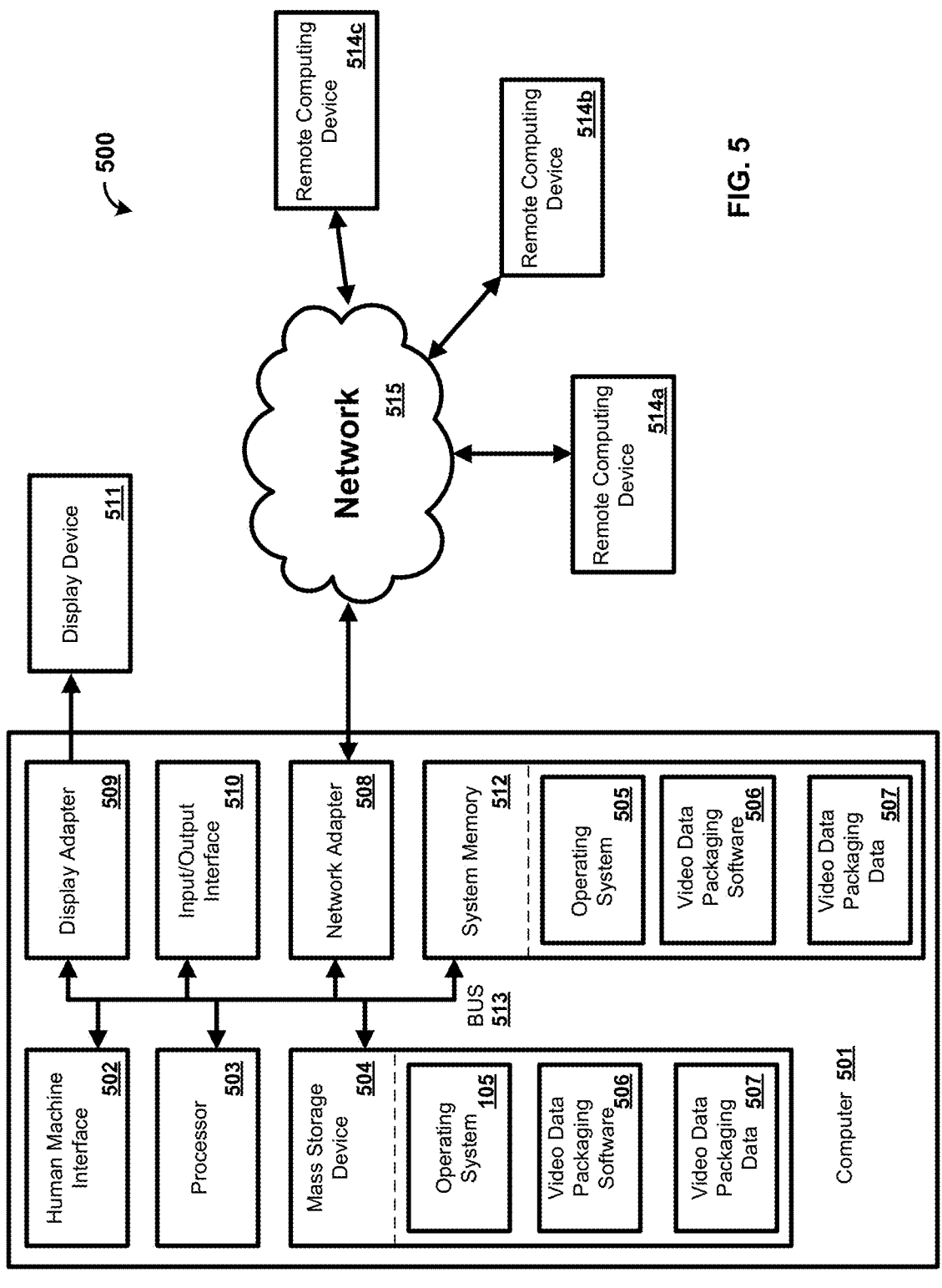
FIG. 5 is a block diagram illustrating an example computing device.

In an exemplary aspect, the methods and systems can be implemented on a computer 501 as illustrated in FIG. 5 and described below. By way of example, central location 101 of FIG. 1 can include one or more computers as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. The system can utilize parallel computing.

The system bus 513 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 513, and all buses specified in this description can also be implemented over a wired or wireless network connection and each of the subsystems, including the one or more processors 503, a mass storage device 504, an operating system 505, video data packaging software 506, video data packaging data 507, a network adapter 508, the system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as the video data packaging data 507 and/or program modules such as the operating system 505 and the video data packaging software 506 that are immediately accessible to and/or are presently operated on by the one or more processors 503.

In another aspect, the computer 501 can also comprise other removable/non-removable, volatile/non-volatile computer storage media. By way of example, FIG. 5 illustrates the mass storage device 504 which can provide non-volatile storage of computer code, computer readable instructions, data structures, program modules, and other data for the computer 501. For example and not meant to be limiting, the mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, the operating system 505 and the video data packaging software 506. Each of the operating system 505 and the video data packaging software 506 (or some combination thereof) can comprise elements of the programming and the video data packaging software 506. The video data packaging data 507 can also be stored on the mass storage device 504. The video data packaging data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 503 via the human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, the display device 511 can also be connected to the system bus 513 via an interface, such as the display adapter 509. It is contemplated that the computer 501 can have more than one display adapter 509 and the computer 501 can have more than one display device 511. For example, the display device 511 can be a monitor, an LCD (Liquid Crystal Display), or a projector. In addition to the display device 511, other output peripheral devices can comprise components such as speakers (not shown) and a printer (not shown) which can be connected to the computer 501 via the Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514*a,b,c*. By way of example, a remote computing device can be a personal computer, portable computer, smartphone, a server, a router, a network computer, a peer device or other common network node, and so on. Logical connections between the computer 501 and a remote computing device 514*a,b,c* can be made via a network 515, such as a local area network (LAN) and/or a general wide area network (WAN). Such network connections can be through the network adapter 508. The network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the one or more processors 503 of the computer. An implementation of the video data packaging software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving, by a video packager, a first portion of a video stream;
   determining, by the video packager, that the first portion of the video stream does not conform to one or more validation parameters; and
   sending, by the video packager based on the first portion of the video stream not conforming to the one or more validation parameters, a default video output instead of the first portion of the video stream.

2. The method of claim 1, wherein the default video output comprises one or more of a still image, a solid color video output having a silent corresponding audio track or an image associated with a content source of the video stream.

3. The method of claim 1, wherein determining, by the video packager, that the first portion of the video stream does not conform to the one or more validation parameters comprises comparing a stream index value of the first portion of the video stream to an expected stream index.

4. The method of claim 1, wherein determining, by the video packager, that the first portion of the video stream does not conform to the one or more validation parameters comprises detecting one or more corrupt packets in the first portion of the video stream.

5. The method of claim 1, wherein determining, by the video packager, that the first portion of the video stream does not conform to the one or more validation parameters comprises determining that a number of missing packets in the first portion of the video stream satisfies a threshold.

6. The method of claim 1, further comprising:
   receiving, by the video packager, signaling data associated with the first portion of the video stream; and
   sending, by the video packager, the signaling data with the default video output.

7. The method of claim 1, wherein determining, by the video packager, that the first portion of the video stream does not conform to the one or more validation parameters comprises determining that one or more attributes of the first portion of the video stream does not match a corresponding one or more attributes indicated in a profile used to encode the first portion of the video stream.

8. One or more non-transitory computer-readable media storing processor-executable instructions that, when executed by at least one processor, cause the at least one processor to:
   receive a first portion of a video stream;
   determine that the first portion of the video stream does not conform to one or more validation parameters; and
   send, based on the first portion of the video stream not conforming to the one or more validation parameters, a default video output instead of the first portion of the video stream.

9. The one or more non-transitory computer-readable media of claim 8, wherein the default video output comprises one or more of a still image, a solid color video output having a silent corresponding audio track or an image associated with a content source of the video stream.

10. The one or more non-transitory computer-readable media of claim 8, wherein the processor-executable instructions that, when executed by the at least one processor, cause the at least one processor to determine that the first portion of the video stream does not conform to the one or more validation parameters, cause the at least one processor to compare a stream index value of the first portion of the video stream to an expected stream index.

11. The one or more non-transitory computer-readable media of claim 8, wherein the processor-executable instructions that, when executed by the at least one processor, cause the at least one processor to determine that the first portion of the video stream does not conform to the one or more validation parameters, cause the at least one processor to detect one or more corrupt packets in the first portion of the video stream.

12. The one or more non-transitory computer-readable media of claim 8, wherein the processor-executable instructions that, when executed by the at least one processor, cause the at least one processor to determine that the first portion of the video stream does not conform to the one or more validation parameters, cause the at least one processor to determine that a number of missing packets in the first portion of the video stream satisfies a threshold.

13. The one or more non-transitory computer-readable media of claim 8, wherein the processor-executable instructions, when executed by the at least one processor, further cause the at least one processor to:
   receive signaling data associated with the first portion of the video stream; and
   send the signaling data with the default video output.

14. The one or more non-transitory computer-readable media of claim 8, wherein the processor-executable instructions that, when executed by the at least one processor, cause the at least one processor to determine that the first portion of the video stream does not conform to the one or more validation parameters, cause the at least one processor to determine that one or more attributes of the first portion of the video stream does not match a corresponding one or more attributes indicated in a profile used to encode the first portion of the video stream.

15. An apparatus comprising:
   one or more processors; and
   memory storing processor-executable instructions that, when executed by the one or more processors, cause the apparatus to:
      receive a first portion of a video stream;
      determine that the first portion of the video stream does not conform to one or more validation parameters; and
      send, based on the first portion of the video stream not conforming to the one or more validation parameters, a default video output instead of the first portion of the video stream.

16. The apparatus of claim 15, wherein the default video output comprises one or more of a still image, a solid color video output having a silent corresponding audio track or an image associated with a content source of the video stream.

17. The apparatus of claim 15, wherein the processor-executable instructions that, when executed by the one or more processors, cause the apparatus to determine that the first portion of the video stream does not conform to the one or more validation parameters, cause the apparatus to compare a stream index value of the first portion of the video stream to an expected stream index.

18. The apparatus of claim 15, wherein the processor-executable instructions that, when executed by the one or more processors, cause the apparatus to determine that the first portion of the video stream does not conform to the one or more validation parameters, cause the apparatus to detect one or more corrupt packets in the first portion of the video stream.

19. The apparatus of claim 15, wherein the processor-executable instructions that, when executed by the one or more processors, cause the apparatus to determine that the first portion of the video stream does not conform to the one or more validation parameters, cause the apparatus to determine that a number of missing packets in the first portion of the video stream satisfies a threshold.

20. The apparatus of claim 15, wherein the processor-executable instructions, when executed by the one or more processors, further cause the apparatus to receive signaling data associated with the first portion of the video stream; and send the signaling data with the default video output.

21. The apparatus of claim 15, wherein the processor-executable instructions that, when executed by the one or more processors, cause the apparatus to determine that the first portion of the video stream does not conform to the one or more validation parameters, cause the apparatus to determine that one or more attributes of the first portion of the video stream does not match a corresponding one or more attributes indicated in a profile used to encode the first portion of the video stream.

22. A system comprising:

a computing device configured to:

receive a first portion of a video stream;

determine that the first portion of the video stream does not conform to one or more validation parameters; and send, based on the first portion of the video stream not conforming to the one or more validation parameters, a default video output instead of the first portion of the video stream; and a user device configured to:

receive the default video output instead of the first portion of the video stream.

23. The system of claim 22, wherein the default video output comprises one or more of a still image, a solid color video output having a silent corresponding audio track or an image associated with a content source of the video stream.

24. The system of claim 22, wherein to determine that the first portion of the video stream does not conform to the one or more validation parameters, the computing device is configured to compare a stream index value of the first portion of the video stream to an expected stream index.

25. The system of claim 22, wherein to determine that the first portion of the video stream does not conform to the one or more validation parameters, the computing device is configured to detect one or more corrupt packets in the first portion of the video stream.

26. The system of claim 22, wherein to determine that the first portion of the video stream does not conform to the one or more validation parameters, the computing device is configured to determine that a number of missing packets in the first portion of the video stream satisfies a threshold.

27. The system of claim 22, wherein the computing device is further configured to:

receive signaling data associated with the first portion of the video stream; and send the signaling data with the default video output.

28. The system of claim 22, wherein to determine that the first portion of the video stream does not conform to the one or more validation parameters, the computing device is configured to determine that one or more attributes of the first portion of the video stream does not match a corresponding one or more attributes indicated in a profile used to encode the first portion of the video stream.

* * * * *